United States Patent
Sieffert et al.

(10) Patent No.: US 6,594,662 B1
(45) Date of Patent: Jul. 15, 2003

(54) METHOD AND SYSTEM FOR GATHERING INFORMATION RESIDENT ON GLOBAL COMPUTER NETWORKS

(75) Inventors: Kent J. Sieffert, Woodbury, MN (US); Curtis A. Schaffran, Apple Valley, MN (US)

(73) Assignee: NetShadow, Inc., Saint Paul, MN (US)

( * ) Notice: Subject to any disclaimer, the term of this patent is extended or adjusted under 35 U.S.C. 154(b) by 0 days.

(21) Appl. No.: 09/346,064

(22) Filed: Jul. 1, 1999

Related U.S. Application Data

(60) Provisional application No. 60/091,348, filed on Jul. 1, 1998.

(51) Int. Cl.[7] .............................................. G06F 17/30
(52) U.S. Cl. ............................................. 707/10; 707/3
(58) Field of Search .............................. 707/10, 3, 203; 709/202, 222, 223; 379/114.01, 230; 713/27, 200, 324; 700/10; 704/267; 705/65; 706/15

(56) References Cited

U.S. PATENT DOCUMENTS

| | | | | |
|---|---|---|---|---|
| 5,850,442 A | * | 12/1998 | Muftic | 705/65 |
| 5,991,389 A | * | 11/1999 | Ram et al. | 379/230 |
| 6,185,553 B1 | * | 2/2001 | Byrd et al. | 707/3 |
| 6,304,864 B1 | * | 10/2001 | Liddey et al. | 706/15 |

OTHER PUBLICATIONS http://developer.java.sun.com/developer/technicalArticles/Networking/time.*
David Reilly, "Simple Handling of Network" Jun. 3, 2002 and copyright 1995–2002; Java Developer Connection of java.sun.com vol. unknown, pp. 1–11.*

* cited by examiner

Primary Examiner—Diane D. Mizrahi
(74) Attorney, Agent, or Firm—Schwegman, Lundberg, Woessner & Kluth, P.A.

(57) ABSTRACT

A method and system for confidentially accessing and reporting information present on global computer networks. The present invention deterministically analyzes a set of network resources over a configurable monitoring period, thereby guaranteeing that recently published information is retrieved. The present invention includes a scalable software system that can be readily executed on a stand-alone computing system or distributed across a network of computing devices. At the end of each monitoring-period, the present invention balances the traversal and searching of network resources across the computing devices in the distributed system according to the previous number of pages retrieved for each network resources, thereby more accurately balancing the system. Furthermore, in order to reduce system resource requirements, the present invention searches only those network resources that are targeted either individually or as a industry. In addition, the present invention further conserves computing resources by not searching documents or files that have already matched search criteria and have remained unchanged.

14 Claims, 10 Drawing Sheets

| | |
|---|---|
| SEMICONDUCTOR | ... THE SEMICONDUCTOR IS FORMED BY DEPOSITING A LAYER OF ...<br>... A SEMICONDUCTOR WAFER OFTEN HAS A VARIETY OF LAYERS ...<br>... THE SURFACE OF THE SEMICONDUCTOR CONTAINS AN INSULATOR ... |
| SOFTWARE | ... THE SOFTWARE IS WRITTEN IN C++ ...<br>... THE SOFTWARE SYSTEM ID MULTITASKING ...<br>... A MUTEX IS A SOFTWARE MECHANISM TO INSURE ... |
| SYSTEM | ... THE SOFTWARE SYSTEM IS MULTITASKING ...<br>... THE PROGRAMMER CREATES A SYSTEM OF OBJECTS AND INSTANTIATES ... |
| SILICON | ... THE SILICON IS ADDED USING A VAPOR DEPOSITION PROCESS ...<br>... AN N–P JUNCTION IS FORMED IN THE SILICON BY ... |
| SURFACE | ... THE SURFACE OF THE SEMICONDUCTOR CONTAINS AN INSULATOR ...<br>... A VAPOR DEPOSITION PROCESS DEPOSITS MATERIAL ON THE SURFACE OF ... |

Fig. 8

METHOD AND SYSTEM FOR GATHERING INFORMATION RESIDENT ON GLOBAL COMPUTER NETWORKS

RELATED APPLICATION

This application claims priority from U.S. Provisional Application Serial No. 60/091,348, filed Jul. 1, 1998.

TECHNICAL FIELD

This invention relates generally to the field of information management, and more particularly to a method and system for confidentially tracking and reporting information available on global computer networks.

BACKGROUND

The Internet has experienced exponential growth and the number of interconnected computers is quickly approaching one billion worldwide. As such, the Internet provides unprecedented access to massive volumes of information and resources. An entity resource, such as a company, organization, periodical, etc., presents information to the Internet by uploading the information to a server that is connected to one of the interconnected networks and has a registered Internet Protocol (IP) address. Often, an entity organizes its information on the server as a hierarchy of pages composed with hypertext markup language (HTML). Along with general information, each page may contain links to other informative items including graphics, documents or even links to other web sites. Users can easily access an entity's information using a graphical software program referred to as a browser. Because the Internet is essentially a vast web of interconnected computers, databases, systems and networks, an entity's information is often referred to as its "website". For this reason, the Internet and its interconnected web sites is often referred to as the World Wide Web. Finding relevant information on the Internet, including the millions of websites and the billions of individual web pages, is a difficult task that has been inadequately addressed.

Many companies have developed search engines in an attempt to ease the location and retrieval of information from the Internet. Examples of current search systems include the AltaVista™ search engine developed by Digital Equipment Corp., Lycos™, Infoseek™, Excite™ and Yahoo™. Most conventional search systems consist of two components. First, a data gathering component, known as a webcrawler or robot, systematically traverses the Internet and retrieves information from various websites. Often, the webcrawler moves from website to website traversing every link found. As the individual websites are accessed, each page of information is retrieved, analyzed and stored for subsequent searching and retrieval. After retrieving and examining each page of a website, the webcrawler moves on to another site on the Internet. While the webcrawler is traversing various websites and retrieving the pages of information, the webcrawler indexes the information presented by each page and stores a link to each page and the corresponding index information in a repository such as a database.

The second component of conventional search systems is the search engine. The search engine provides an interface for selecting the links stored in the repository in order to identify web pages with desired content. For example, the above mentioned search engines allow a user to enter various search criteria. The search engine probes the stored index information generated by the webcrawler according to the search criteria. The search controller presents to the user any stored links having corresponding index information that satisfies the entered search criteria. The user is able to view the actual page located on the original website by following the link to the actual website.

SUMMARY

The present invention is directed to a method and system for systematically tracking a defined set of network resources on a global computing network. The method and system can be arranged to deterministically guarantee that any information from the sites is relevant and current. The method and system also can be arranged to increase the confidentiality of search parameters and the identities of parties seeking information.

In one embodiment, the present invention provides a computer-implemented method for gathering information from network resources on a global computer network, the method comprising assigning search times to the network resources, the search times designating times at which the network resources are to be searched within a monitoring period, categorizing the network resources into industry groups, generating search items, each of the search items defining a search for particular information and designating one or more of the industry groups, identifying, at a given search time, the network resources that have been assigned the given search time and categorized into industry groups designated by one or more of the search items, retrieving and storing information from the identified network resources, and performing the searches defined by one or more of the search items on the stored information.

In another embodiment, the present invention provides a method for gathering information from network resources on a global computer network, the method comprising assigning search times to the network resources, the search times designating times at which the network resources are to be searched within a monitoring period, generating search items, each of the search items defining a search for particular information and designating one or more of the network resources, identifying, at a given one of the search times, the network resources that have been assigned the given search time and which are designated by one or more of the search items, retrieving and storing information from the identified network resources, whereby information from the network resources that have not been assigned the given search time or are not designated by one or more of the search items is not retrieved and stored, and performing the searches defined by one or more of the search items on the stored information.

In a further embodiment, the present invention provides a method for gathering information from network resources on a global computer network, the method comprising generating a set of search items, each of the search items defining a search for particular information and designating one or more of the network resources, retrieving and storing information from the network resources designated by one or more of the search items, performing the searches defined by one or more of the search items on the stored information, and presenting results of the searches.

In an added embodiment, the present invention provides a method for gathering information from network resources on a global computer network, the method comprising categorizing the network resources into industry groups, generating a set of search items, each of the search items defining a search for particular information and designating one or more of the industry groups, retrieving and storing information from the network resources associated with the industry groups designated by one or more of the search items, performing the searches defined by the search items on the stored information, and presenting results of the searches.

In another embodiment, the present invention provides a method for gathering information from network resources on a global computer network, the method comprising selecting a set of network resources residing on the global computer network, assigning a search time to each of the network resources, the search time indicating a time within a monitoring period in which the network resource is to be searched, generating a set of search items, each of the search items defining parameters for a search and designating one or more of the network resources to be searched, determining, at approximately the search time for each of the network resources, whether the respective network resource is designated for searching by at least one of the search items, retrieving and storing information from the network resources designated by at least one of the search items, performing the searches defined by the search items on the stored information, and presenting results of the searches to users.

In a further embodiment, the present invention provides a software system for monitoring network resources residing on a global computer network over a time interval, the system comprising a database storing resource identifiers that correspond to particular network resources, and search items that define a search for information and specify one or more of the network resources, a system executive that constructs a set of the resource identifiers scheduled to be searched, and a set of the search items specifying at least one of the network resources corresponding to one of the resource identifiers of the constructed resource identifier set, a collection controller, for each of the resource identifiers of the constructed set of resource identifiers, the collection controller retrieving information presented by the networked resource corresponding to the resource identifier, a search controller for receiving the information retrieved by each of the collection controllers, and a search instance, for each search item of the search item list, wherein the search controller instantiates each search instance to perform the search defined by the respective search item on the information received from the collection controllers for the network resource specified by the respective search item.

In an added embodiment, the present invention provides a method for monitoring information presented by at least one of a plurality of networked computers comprising storing a plurality of identifiers, wherein each identifier corresponds to one of the plurality of networked computers, storing a plurality of search items, wherein each search item includes search criteria and at least one networked computer to be monitored, generating a set of identifiers to be searched, generating a set of search items monitoring at least one of the networked computers corresponding to one of the identifiers of the identifier set, retrieving information presented by each of the networked computers corresponding to an identifier of the identifier set, and searching the retrieved information according the search criteria of each search item of the search item set monitoring the networked computer corresponding to the retrieved information.

Other advantages, features, and embodiments of the present invention will become apparent from the following detailed description and claims.

BRIEF DESCRIPTION OF THE DRAWINGS

FIG. 8 is one example of a report generated by the software system for reporting matching information to a client;

DETAILED DESCRIPTION

Figure 1:
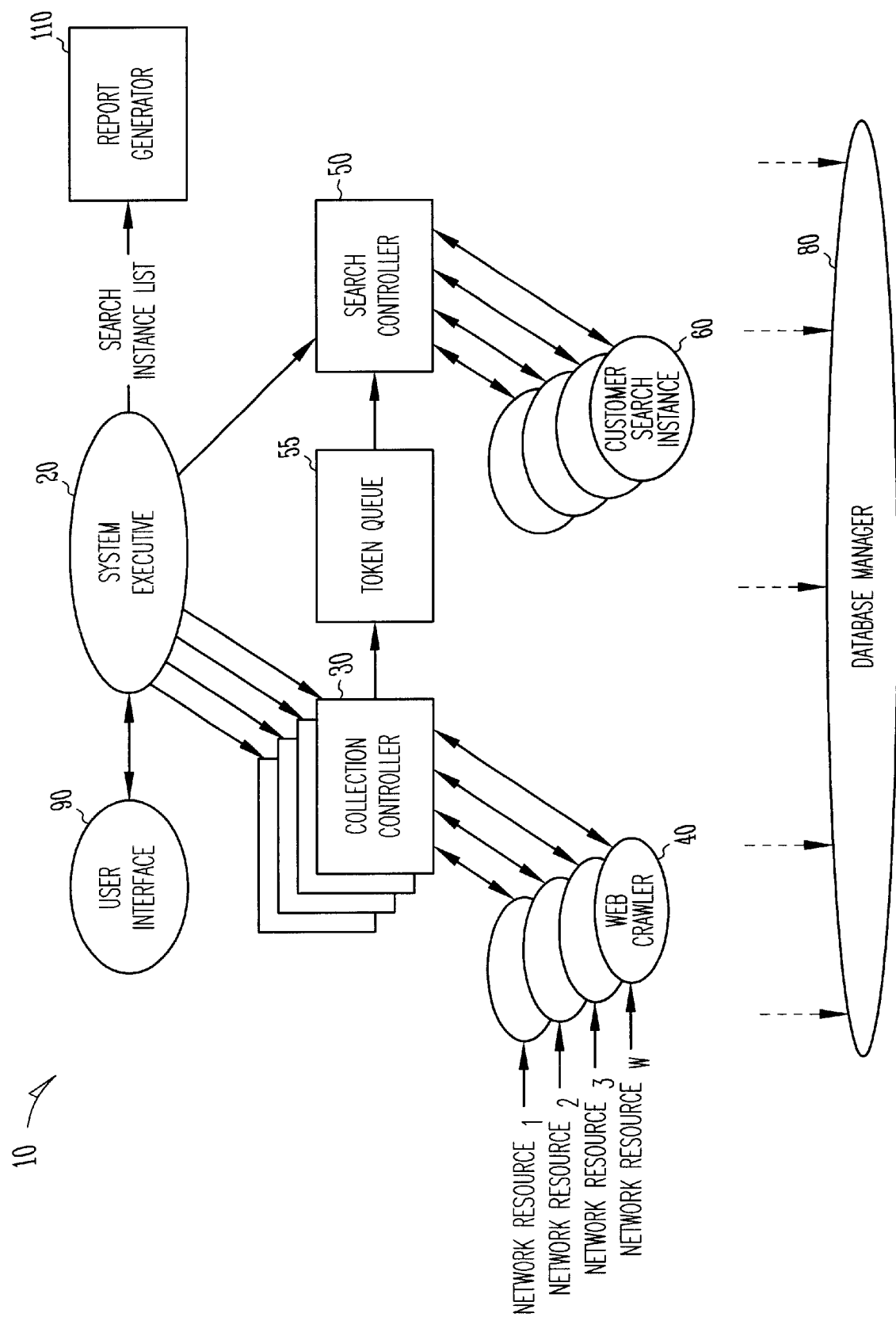
FIG. 1 is a block diagram of a software system for accessing and reporting network resources on global computer networks in accordance with the present invention.

In the following detailed description, references are made to the accompanying drawings which illustrate specific embodiments in which the invention may be practiced. Electrical, mechanical and programmatic changes may be made to the embodiments without departing from the spirit and scope of the present invention. The following detailed description is, therefore, not to be taken in a limiting sense and the scope of the present invention is defined by the appended claims and their equivalents.

Conventional search systems are deficient in many ways. For example, due to the vast information and myriad of sites residing on the Internet, conventional search systems produce excess, irrelevant information. A rather narrowly defined search on many of the conventional systems may easily produce thousands of references. Because the web-crawler traverses each and every site that it finds on the Internet, valuable information is often lost among thousands of references to irrelevant sites. Furthermore, conventional systems are, in a sense, non-deterministic. The matching links presented to the user by the search controller often no longer exist. Furthermore, the index information stored in the repository for a particular page is often incorrect and does not contain recently released information. In addition, conventional search engines require huge resources to store the index information and links for subsequent analysis.

Conventional search engines are also incredibly labor intensive. In order to search for specific information on the internet, a user is forced to access one or more publicly available search systems, enter its search criteria and manually parse the results. This process is tedious and time consuming. For example, the user is forced to periodically repeat the process in order to determine if any new information has been released. In order to identify any new information, however, the user is forced to parse through the previous information already examined.

Conventional search systems are also non-confidential. For example, in order to reduce the numerous irrelevant references produced by conventional systems as described above, a user must narrowly define the search criteria. Often, the user is forced to provide a fairly comprehensive description of the desired information before the number of matches approaches a manageable number. This, however, is problematic in that it forces the user to divulge the idea being researched. For this reason, there is currently no feasible mechanism to search the Internet without divulging trade secrets or other intellectual property. The inability to confidentially retrieve information from the Internet manifests itself in other areas besides the use of conventional search engines. For example, many web sites provide a local search mechanism to assist in finding information within the web site. A user is able to access a web page and find all relevant information simply by engaging the search mechanism. This, however, forces the user to describe the desired information in detail and disclose the information to the website. Thus, the user is unknowingly revealing the details regarding the desired information. Furthermore, because the IP address of a user is readily available to the host site, not only is the information revealed, but the user is easily identified.

FIG. 1 is a block diagram of a software system 10 for confidentially accessing and reporting information present on global computer networks, such as the Internet, in accordance with the present invention. Software system 10 includes system executive 20, one or more collection controllers 30, one or more web crawlers 40, search controller 50, one or more customer search instances 60, report generator 70, database manager 80 and user interface 90.

Figure 2:
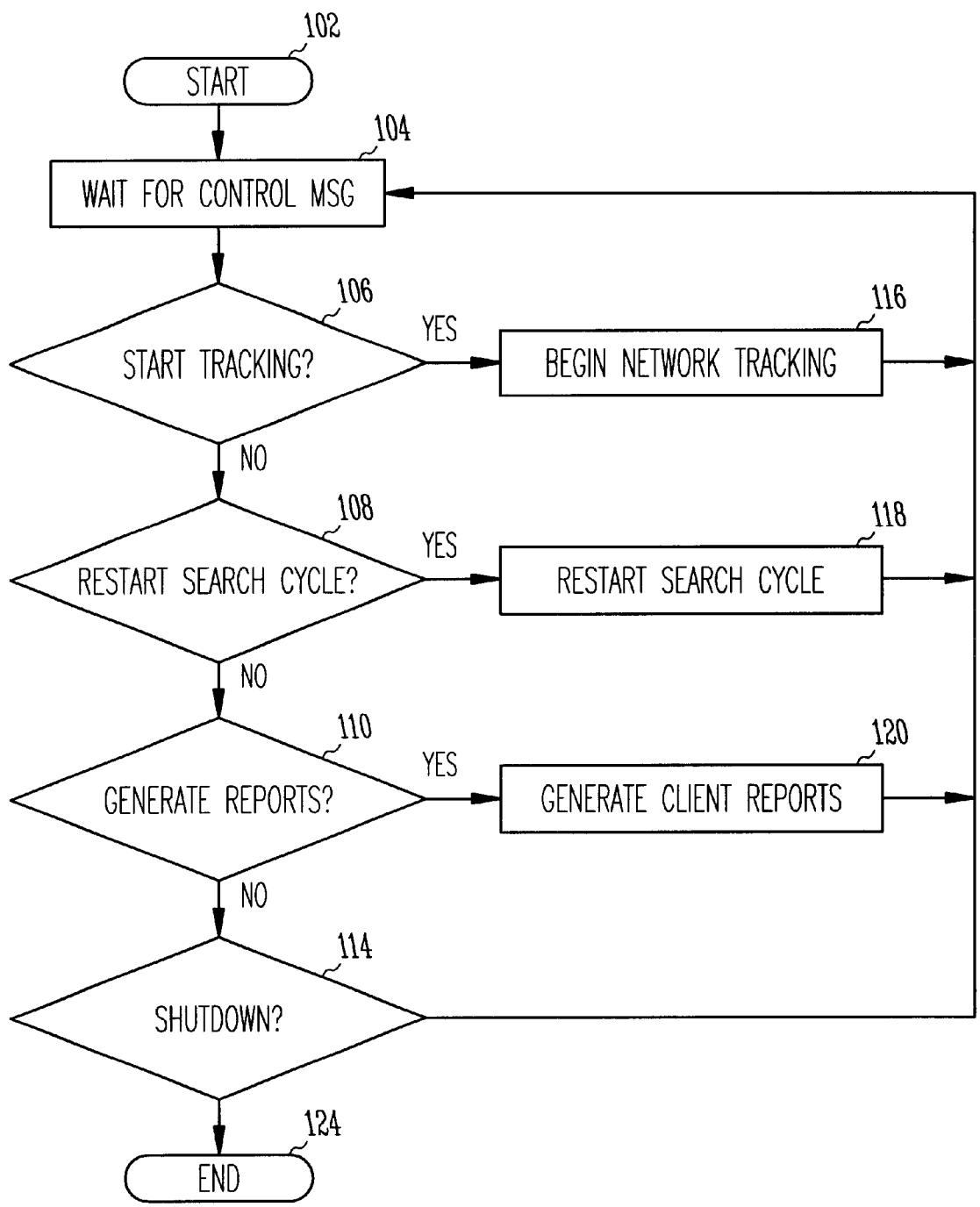
FIG. 2 is a flow chart illustrating a high-level operation of a system executive in order to control the various software components of the software system.

System executive 20 is responsible for overall control and management of software system 10. FIG. 2 is a flow chart illustrating one mode of operation of system executive 20. Upon initial execution of software system 10, system executive 20 starts execution in step 100, immediately proceeds to step 102 and instantiates database manager 80 for managing all accesses to a database (not shown). In one embodiment, database manager 80 has its own thread of execution. Preferably, database manager 80 has a client/server interface whereby other components of software system 10 initiate a remote procedure call in order to access the data of a database. In this manner, all accesses of database 100 are synchronized and inherently thread safe. Upon instantiating database manager 80, system executive 20 commands database manager 80 to retrieve configuration data from a database. Typical configuration data includes a maximum number of concurrent collection controllers 30 that may be instantiated concurrently, a maximum number of concurrent web crawlers 40 and a maximum number of concurrent customer search items 60.

System executive 20 proceeds from step 102 to step 104 and waits for a control message. Control messages can be issued to system executive 20 in two ways. First, user interface 90 presents a graphical interface by which an operator controls software system 10. After receiving input from the operator, user interface 90 communicates a control message to system executive 20. Second, software system 10 includes an timer thread (not shown) that awakens at user-configurable times and sends control messages to system executive 20, thereby triggering automatic execution of software system 10. Referring again to FIG. 2, system executive 20 receives control messages in step 104 and sequentially executes steps 106 through 114 to determine the nature of the received control message.

Figure 3:
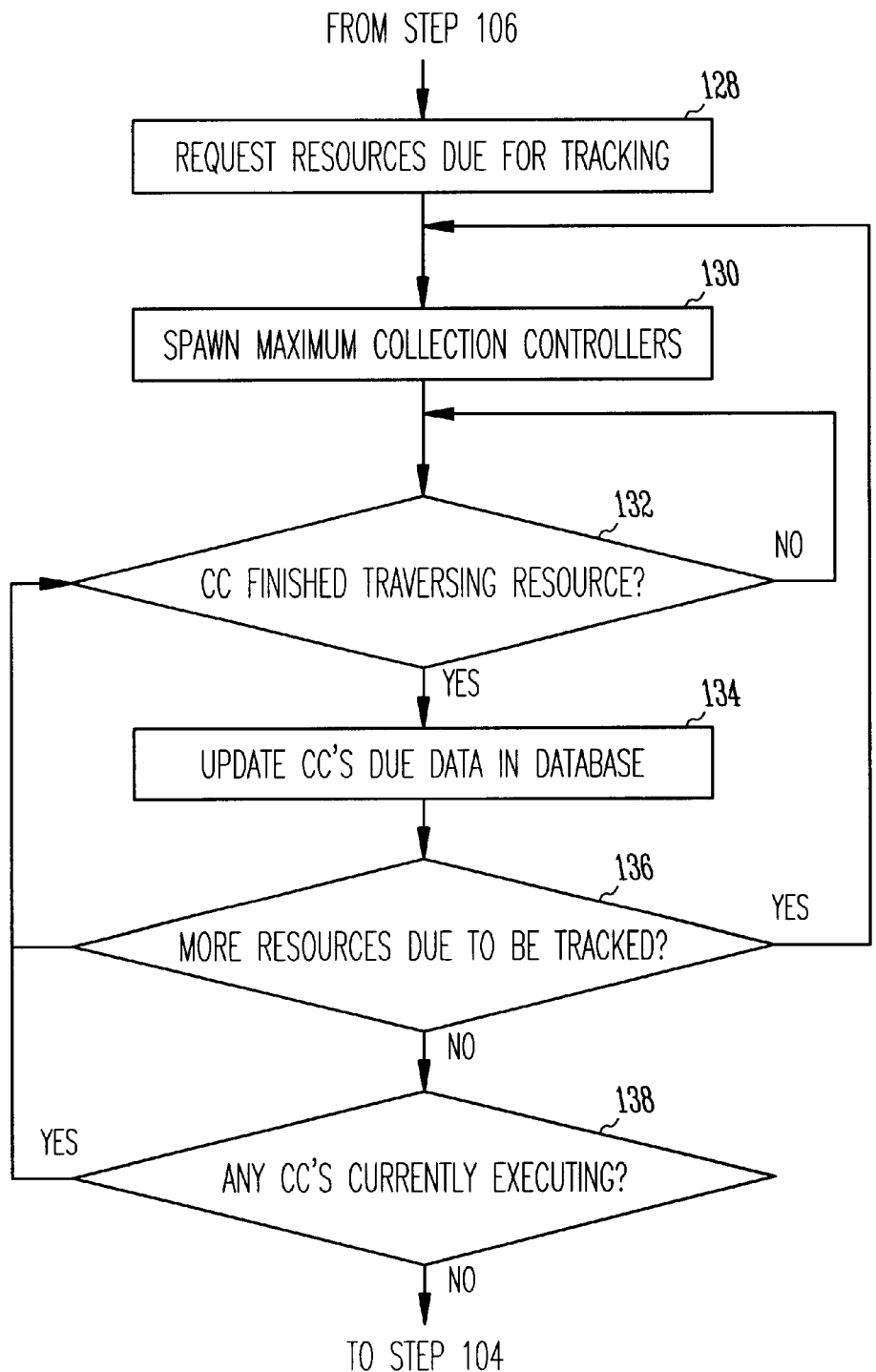
FIG. 3 is a flow chart illustrating one mode of operation in which the system executive controls the software system to access and search the network resources that are due to be searched and currently targeted by a search item.

If a StartTracking control message is received, system executive 20 proceeds from step 106 to step 116 and analyzes information present on network resources in accordance with the present invention. FIG. 3 illustrates one mode of operation of system executive 20 for analyzing network resources that are due to be tracked. In step 116, system executive 20 proceeds to step 128 and retrieves information on the daily resources that are due to be analyzed. More specifically, the database of software system 10 stores a plurality of resource identifiers, each identifier corresponding to a resource residing on the global computer network. In one embodiment, the database stores a plurality of domains for monitoring. Each domain identifies a website of a company, government body or other organization. Each resource identifier is categorized into one of a plurality of industry groups. Each resource includes a search date that indicates when the resource is to be searched within the monitoring period. As discussed below, software system 10 deterministically monitors the resources over a configurable period such as one week, one month or even one year. In other embodiments, the database may stores a plurality of domains that identify web-based databases, such as trademark, domain name, or toll free telephone number databases, for monitoring of competitive activity or availability of such assets. Thus, the databases can be analyzed in a systematic fashion to maintain a "watch" for activity with respect to such assets.

In addition to a plurality of resource identifiers, the database contains a plurality of search items. Each search item includes general information, such as a type which may be patent, trademark, etc., an abstract and search criteria. Furthermore, each search item designates one or more network resources or industry groups to be monitored. In step 130, system executive 20 instructs database manager 80 to retrieve: (1) a set of the stored search items, and (2) a set of pending network resources that are due to be searched and are designated by at least one of the search items. In this manner, software system 10 need not waste computing resources in order to analyze network resources that are not being tracked.

Upon receiving the daily tracking information from database manager 80 in step 128 (FIG. 3), system executive 20 proceeds to step 130 and instantiates a corresponding collection controller 30 for each pending network resource, subject to the user-configured maximum number of concurrently executing collection controllers 30. Each collection controller 30 is responsible for analyzing the website of its corresponding resource. In one embodiment, each collection controller 30 has its own thread of execution and receives an address, known as the base address, of the network resource to be analyzed. For example, the base address may be "www.netshadow.com".

After spawning the maximum number of collection controllers 30, system executive 20 proceeds to step 132 and waits for one of the executing collection controllers 30 to finish traversing the corresponding network resource and retrieving its contents. When a collection controller 30 signals completion, system executive 20 proceeds to step 134 and instructs database manager 80 to update the schedule data for the network resource traversed by the finished collection controller 30. In this manner, database manager 80 updates the database such that the traversed network resource will not be traversed again until the next monitoring period. After updating the database, system executive 20 proceeds to step 136 and determines whether there are more network resources scheduled to be traversed and analyzed. If so, system executive 20 jumps back to step 130 and spawns another collection controller 30. If not, system executive 20 proceeds to step 138 and determines whether one or more collection controllers 30 are currently traversing network resources. If so, system executive 20 jumps back to step 132 and waits for another collection controller 30 to finish. When all the collection controllers 30 have finished traversing the pending network resources, system executive 20 returns to step 104 of FIG. 2.

Figure 4:
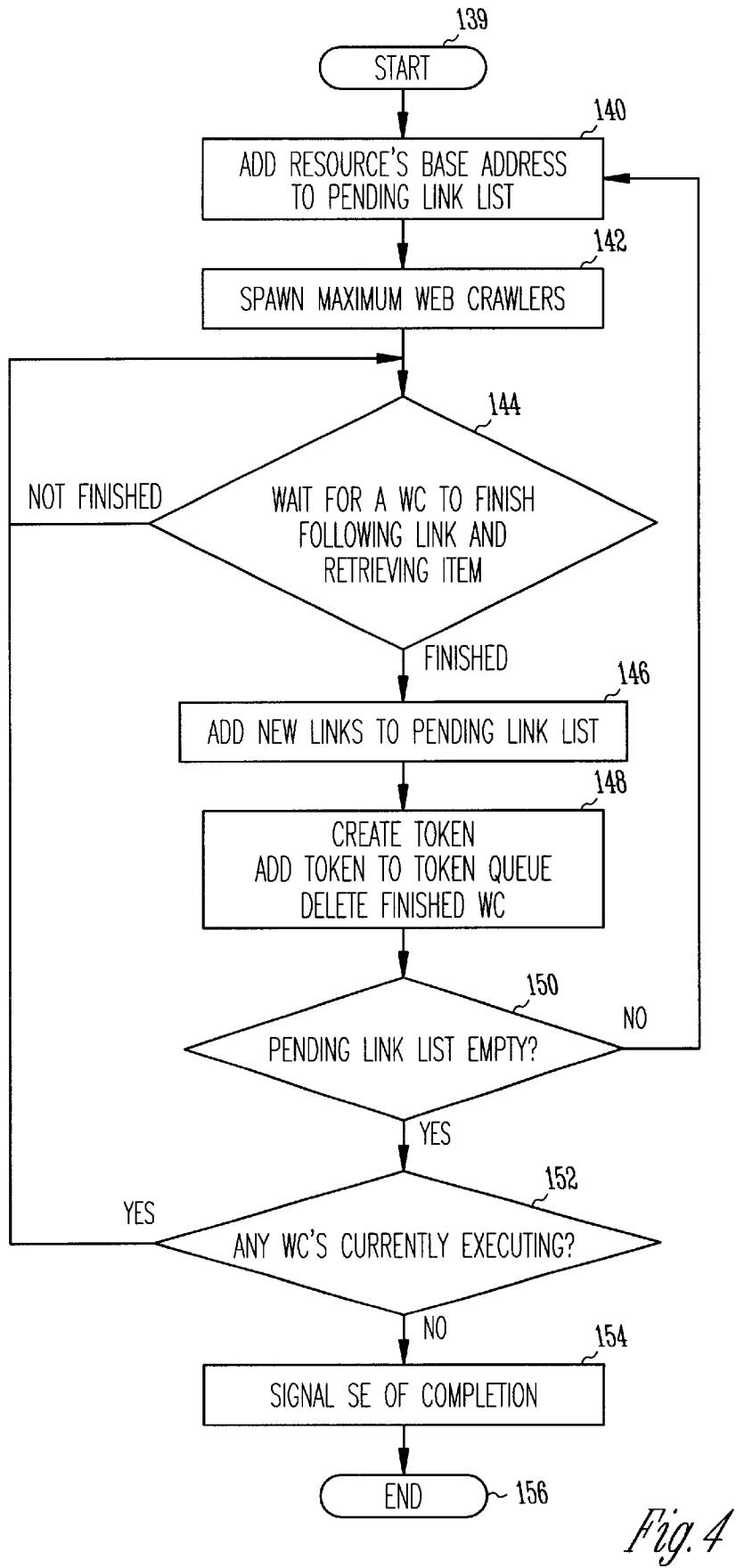
FIG. 4 is a flow chart illustrating one mode of operation of a collection controller responsible for traversing a single network resource.

FIG. 4 is a flow-chart illustrating in detail one mode of operation of an executing collection controller 30. Upon creation by system executive 20, collection controller 30 begins execution in step 139 and immediately proceeds to step 140. In step 140, collection controller 30 creates a "pending link list" for holding links to be followed. Initially, collection controller 30 inserts the base address received from system executive 20. After initializing the pending link list, collection controller 30 proceeds to step 142 and instantiates a web crawler 40 for each link stored in the pending link list, subject to the user-configured maximum concurrent web crawlers. Each web crawler 40 is responsible for retrieving the content of the informative item pointed to by its link. For example, the web crawler 40 may download and store an entire HTML page, a file published using Adobe Acrobat, a graphic file, etc. As described in more detail below, each web crawler 40 also retrieves any links to other informative items the item contains.

When first executing step 142, collection controller 30 creates a single web crawler 40 for retrieving the item pointed to by the base address. In step 144, collection controller 30 waits for a web crawler 40 to finish. When a web crawler 40 has finished retrieving the content of the informative item pointed to by its link, collection controller 30 proceeds to step 146 and receives any links the finished web crawler may have found. Collection controller 30 scans the pending link list and inserts any newly found links that: (1) are not already on the pending link list and (2) that have not already been followed. In step 148, collection controller 30 creates a token (data structure) that describes the information retrieved by finished web crawler 40 and adds the token to token queue 55. In step 148, collection controller 30 deletes the instantiation of the finished web crawler 40, proceeds to step 150 and determines whether any links are pending. If so, collection controller 30 returns to step 140 and spawns another web crawler 40. If no links are pending, collection controller 30 proceeds to step 152 and determines whether any web crawlers 40 are currently executing. If so, collection controller returns to step 144 and waits for one of the executing web crawlers 40 to finish. If no web crawlers 40 are currently executing, collection controller proceeds from step 152 to step 154 and signals system executive 20 that the network resource has successfully been traversed. After signaling system executive 20, collection controller 30 proceeds to step 156 and terminates.

In one embodiment, collection controller 30 maintains and stores a list of successfully crawled links as it traverses the network resource. This embodiment is useful in the event that software system 10 terminates before collection controller 30 is able to completely traverse the network resource. In this case, the next time collection controller 30 attempts to traverse the same network resource it loads the archived list of successfully crawled links. In this manner, collection controller 30 continues to traverse the network resource without retrieving previously retrieved informative items.

In yet another embodiment, collection controller 30 waits a configured delay time before spawning each web crawler 40. In this manner, collection controller 30 ensures a reasonable loading on the network resource being traversed. This aspect is also advantageous in giving the appearance of manually traversing the network resource. For example, in another embodiment, collection controller 30 waits a random delay time, within a range of possible delay time, between the spawning of web crawlers 40, thereby giving the appearance of manually traversing a network resource.

Figure 5:
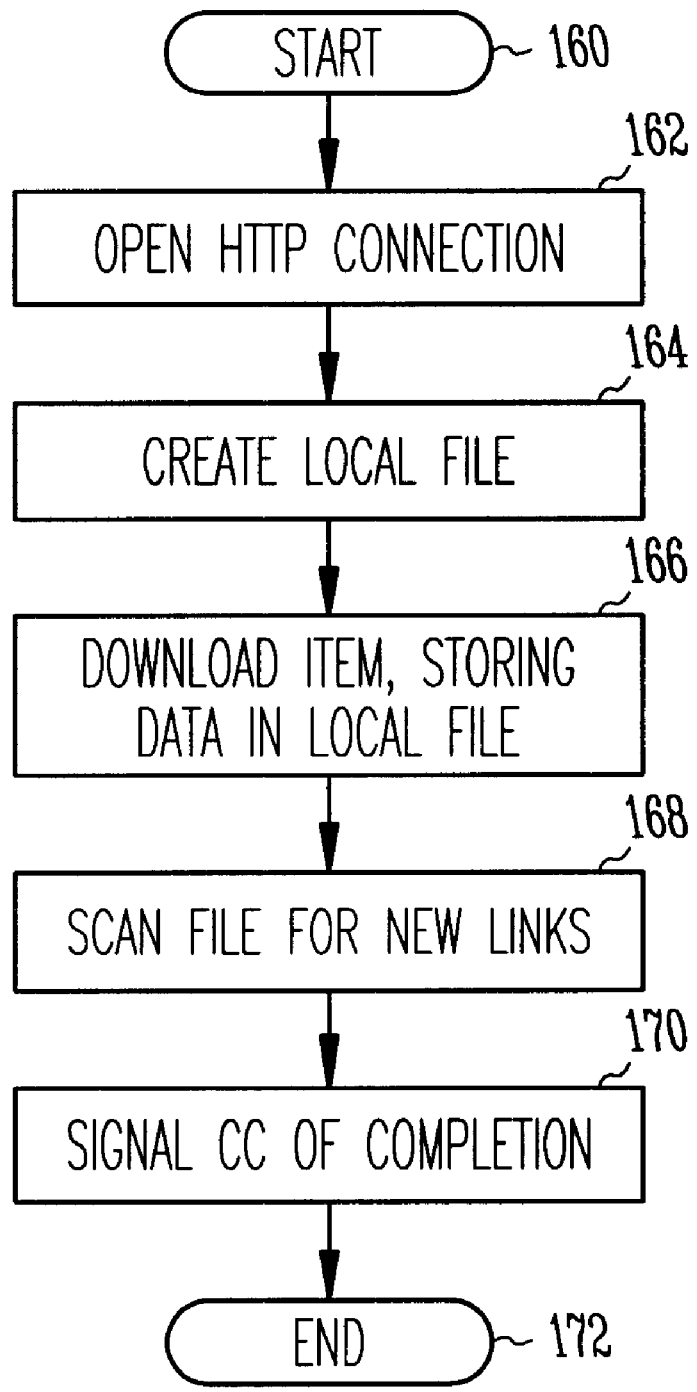
FIG. 5 is a flow chart illustrating one mode of operation of a web crawler responsible for retrieving a single informative item and extracting any links to other informative items.

FIG. 5 is a flow-chart illustrating one mode of operation of web crawler 40. When web crawler 40 is instantiated by collection controller 30, it receives a link to an informative item such as an HTML page, a graphic, an Acrobat file, etc. Web crawler 40 begins execution at step 160, immediately proceeds to step 162 and opens an HTTP connection with the network resource pointed to by the link. Once an HTTP connection is established, web crawler 40 proceeds to step 164 and creates a local file to hold the retrieved informative item. In step 166, web crawler 40 downloads the informative item into the local file. After downloading the item, web crawler 40 proceeds to step 168 and scans the local file for any links to other items. Upon scanning the file, web crawler 40 proceeds to step 170 and signals collection controller 20. After communicating the name of the local file and any newly found links to collection controller 20, web crawler 40 proceeds to step 172 and terminates.

Search controller 50 receives tokens from collection controllers 30 via token queue 55 and is responsible for determining whether a retrieved item satisfies the search criteria of one or more of the search items stored in the database. Each token includes a filename of a local file holding an informative item for searching as well as a type field indicating the file type.

Figure 6:
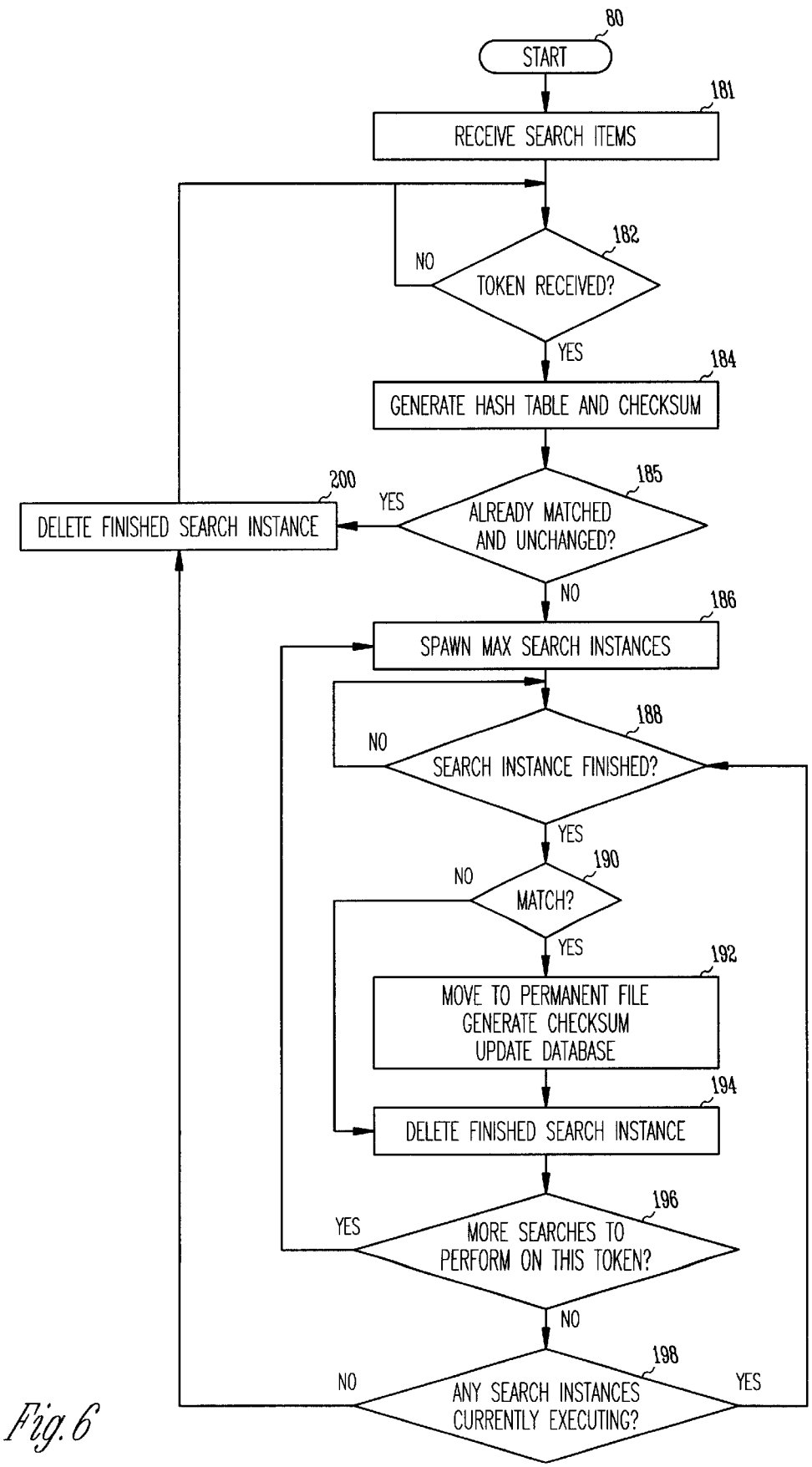
FIG. 6 is a flow chart illustrating one mode of operation of a search controller responsible for managing the analysis of each informative item retrieved by the collection controllers.

FIG. 6 is a flow-chart illustrating one mode of operation of search controller 50. Upon creation by system executive 20, search controller 50 begins execution in step 180 and proceeds to step 181 where it receives a set of search items from system executive 20. Next, search controller 50 proceeds to step 182 and waits for tokens to be placed in the token queue 55 by collection controller 30. When a token is received, search controller 50 proceeds to step 184. In step 184, search controller 50 retrieves the filename and file type from the token, opens the local file indicated by the filename and generates a hash table and a checksum based on the content of the local file.

After generating the hash table and the checksum, search controller 50 proceeds to step 185 and queries database managers 80 to determine whether an informative item having the same link address and checksum has already matched a search. If so, search controller 50 jumps to step 200, deletes the token, returns to step 182 and waits for the next token. In this fashion, search controller 50 conserves computing resources by not searching documents or files that have already matched search criteria and have remained unchanged.

If the test in step 185 fails, search controller 50 advances to step 186 and instantiates a search instance 60 for each search item received from system executive 20, subject to the user-configured maximum concurrent search instances 60. Each search instance 60 is responsible for testing the hash table with the search criteria of the corresponding search item. For example, each search item has one or more search strings similar to the following:

(semicond!*wafer)+(fabric!*chip!)+(memory w/2 module)

where '*' signifies boolean AND, '+' signifies boolean OR, ! is an expansion operator and 'w/x' means within X words.

After spawning a maximum number of search instances in step 186, search controller 50 proceeds to step 188 and waits for a search instance 60 to finish. When a search instance 60 has finished testing the hash table with the search criteria, search controller 50 proceeds to step 190 and queries the finished search instance 60 whether the hash table satisfied the search criteria. If a match did not occur, search controller 50 jumps ahead to step 194. If a match occurred, search controller 50 moves the temporary local file to a more permanent location and stores the new locations, the link address of the original informative item and the checksum in the database.

In step 194, search controller 50 deletes the instantiation of the finished search instance 60, proceeds to step 196 and determines whether any search items still remain for testing against the hash table. If so, search controller 50 returns to step 186 and spawns another search instance 60. If no search items remain, search controller 50 proceeds to step 198 and determines whether any search instances 60 are still examining the hash table. If so, search controller 50 returns to step 188 and waits for one of the executing search instances 60 to finish. If no search instances 60 are currently executing, search controller 50 proceeds from step 198 to step 200 and deletes the token that was popped from the token queue and the corresponding temporary file containing the informative item. Thus, unlike conventional search items that store retrieved information to be used to satisfy future searches, software system 10 deletes all information that does not match current search criteria. In this manner, software system 10 conserves system resources and deterministically guarantees that each search item is tested with current information.

After deleting the token, search controller 50 proceeds to step 182 and waits for the next token. In this manner, software system 10 determnninistically monitors a plurality of network resources over a configurable period. In addition, software system 10 conserves resources by not searching pages that have already satisfied search criteria and have not been changed.

Figure 7:
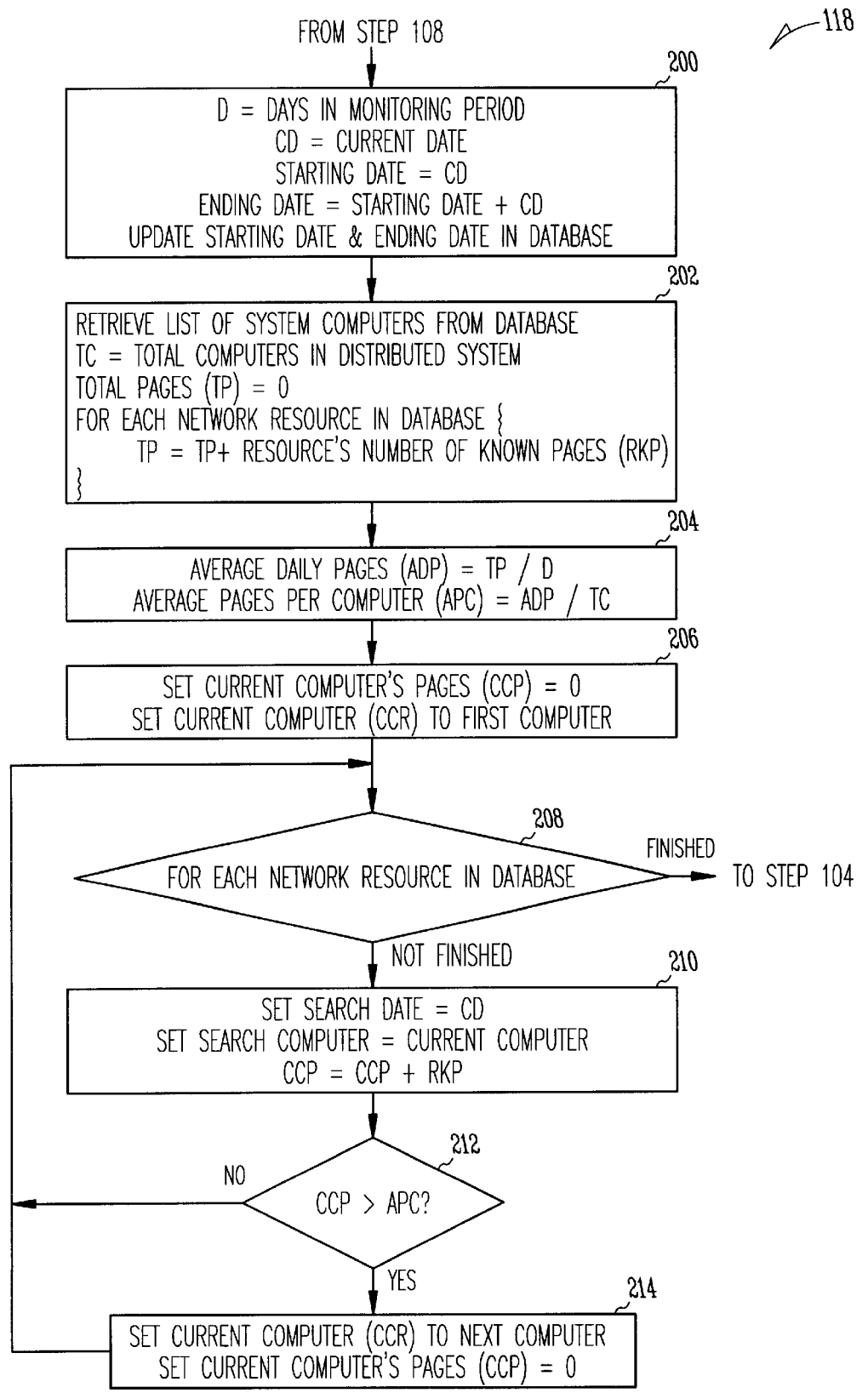
FIG. 7 is a flow chart illustrating one mode of operation in which the software system restarts the monitoring cycle and balances the retrieval and searching of the network resources across a plurality of computing devices according to the actual number of pages previously retrieved from each network resource.

Referring again to FIG. 2, if a RestartSearchCycle control message is received, system executive 20 proceeds from step 108 to step 118 and restarts the monitoring period by invoking a sophisticated load balancing technique. FIG. 7 is a flow-chart illustrating in detail one mode of operation of software system 10 for restarting the monitoring period in step 118. In step 200, system executive 20 sets local variable D equal to the total days of the monitoring period as configured by the operator and stored in the database. This allows the operator to completely control the period in which the set of network resources are completely monitored. Next, system executive 20 sets a local variable CD equal to the current date. System executive 20 instructs database manager 80 to set the starting date of the current search cycle to the current date. Next, system executive 20 commands database manager 80 to set the ending date of the search cycle to the current date plus the number of days in the monitoring period.

After setting the start and ending dates in the database, system executive 20 proceeds to step 202. As discussed in detail below, software system 10 may be distributed over a number of computers. In step 202, system executive 20 queries database manager 80 for a list of all of the computers in the distributed system that traverse network resources by executing collection controllers 30. Based on this list, system executive 20 set a local variable (TC) to a total number of computers in the distributed system that operate as such. Next, system executive 20 instructs database manager 80 to access each network resource identifier stored in the database and retrieve a number of known pages (RKP) for each resource. This value is set whenever a collection controller 30 successfully traverses an entire network resource and indicates the total number of pages retrieved from the resource. As described in detail below, system executive 20 balances the tracked network resources across the number of computers in the distributed system according to the previous number of pages retrieved for the network resources, thereby more accurately load balancing the system. As database manager 80 access each network resource identifier stored in the database, a running total of the number of pages (TP) is maintained.

System executive 20 proceeds from step 202 to step 204 and calculates an average daily pages (ADP) by dividing the total pages by the days in the current monitoring period. System executive 20 further calculates an average pages per computer (APC) by dividing the average daily pages by the total number of computers in the distributed system. This value, APC, reflects the average number of pages (informative items) each computer should retrieve per day for the system to be optimally balanced. In step 206, system executive 20 clears a local variable current computer pages (CCP) and sets another variable, current computer (CCR), to the first computer in the list of computers that execute collection controllers 30. After initializing these variables, system executive 20 proceeds to step 208 and begins the load balancing process.

In step 208, system executive 20 commands database manager 80 to once again access each network resource identifier stored in the database. For each network resource identifier, system executive 20 repeats steps 210, 212 and 214. In step 210, system executive 20 commands database manager 80 to set the network resource identifier's next search date to the date stored in the local variable CD. Initially, this value will be the current date. In addition, system executive 20 commands database manager 80 to set the identifier's search computer to the computer stored in the local variable CCR. System executive 20 adds the number of known pages (RKP) for each resource to the variable CCP, thereby keeping track of the total number of pages assigned to the current computer.

System executive 20 proceeds from step 210 to step 212 and checks whether the number of pages assigned the current computer has exceeded the average (APC) as calculated above. If not, system executive 20 jumps back to step 208 and continues through the network resource identifiers. If the number of pages assigned the current computer has exceeded the average, system executive 20 proceeds from step 212 to step 214 and sets the local variable CCR to the next computer in the list received from database manager 80. If the list has been exhausted, CCR is set to the first computer in the list. Next, system executive 20 resets the variable CCP and jumps back to step 208. When all of the network resource entries in the database have been updated, system executive 20 jumps from step 208 to step 104 (FIG. 2) and waits for another control message. In this manner, system executive 20 sets the next search date and search computer for each network resource. Furthermore, the network resources are evenly balanced throughout the monitoring period and across the computers of the distributed system. This balancing is improved by using stored information on the last number of pages previously retrieved from each network resource. Furthermore, the search cycle can be restarted manually by the operator or by the alarm thread when the current search cycle has completed. In this manner, software system 10 balances the tracking of the network resources upon the completion of each monitoring period.

Referring again to FIG. 2, if a GenerateReports control message is received, system executive 20 proceeds from step 110 to step 120 and commands report generator 110 (FIG. 1) to generate client reports. To create a client report, report generator 110 instructs database manager 80 to retrieve all of the link addresses and permanent file locations recently stored by search controller 50 for informative items that satisfied one or more of the client's search items. The reports can be generated in a variety of forms.

In one embodiment, report generator 110 constructs a hierarchy of HTML files that comprise the client's report and may be viewed by a conventional browser. A main HTML file contains a list of each search item for the client. When one of the search items is selected, the browser displays a second HTML file that more fully describes the search item and its corresponding search criteria. In addition, the second HTML file includes a list of each informative item that satisfied the selected search item's criteria. When one of the informative items is selected, the browser displays the selected informative item with any text that satisfied the search criteria highlighted. In this embodiment, the hierarchy of HTML files includes an HTML file for each informative item. In order to communicate the report to the client, the entire hierarchy of files is placed on a diskette, or other suitable media such as a CDROM, and mailed to the corresponding client. Alternatively, the files may be communicated via electronic mail to the client. Preferably, the electronic communication is encrypted to maximize confidentiality.

In another embodiment, report generator 110 constructs an HTML file for each search item. The HTML file fully describes the search item and its corresponding search criteria. In addition, the HTML file includes a list of informative items that satisfied the selected search item's criteria. Unlike the embodiment described above, in this embodiment, a client report does not actually include the informative items. The HTML file is constructed such that when one of the informative items is selected, the browser follows the link address to the actual network resource containing the item, retrieves the item and displays the item. As in the previous embodiment, each HTML file may be placed on a diskette or electronically mailed to the client.

In yet another embodiment, the report generator 110 retrieves the base address for each network resource that satisfied one or more of a client's search items. Unlike the previous embodiments, report generator 110 does not construct a report based on the network resource's matching informative items but traverses the entire network resource in order to construct a hierarchy of HTML files that form a comprehensive site index. More specifically, report generator 110 formulates a list of every word disclosed by the informative items of the network resource. Based on this list, report generator 110 constructs the index that provides a link to each usage. FIG. 8 illustrates one portion of a sample index. When a particular usage is selected, the browser displays the informative item with the usage highlighted.

Referring again to FIG. 2, if a Shutdown control message is received, system executive 20 proceeds from step 114 to step 124 and deletes database manager 80, search controller 50, token queue 55 and report manager 110. After successful deletion of the various components, system executive 20 and software system 10 terminate.

The present invention described above is suitable for executing on a single computer having a storage device and network interface such as a network card, an ISDN terminal adapter or a high-speed modem. The present invention, however, may readily be distributed across a system having multiple computers in order to efficiently monitor large numbers of network resources.

Figure 9:
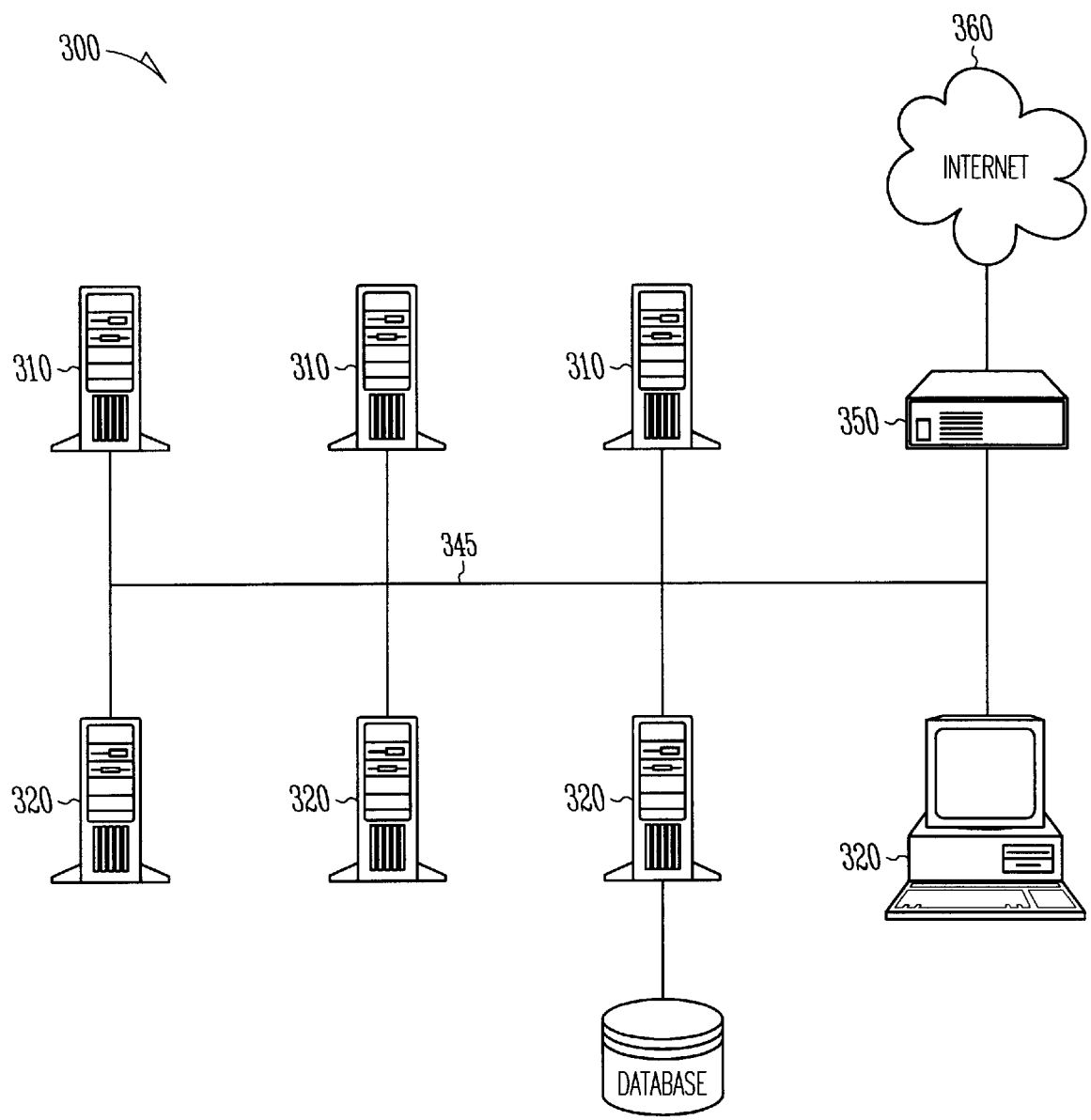
FIG. 9 is block diagram of a computing system having a plurality of computing devices suitable for executing the software system in a distributed manner.

FIG. 9 is a block diagram of a distributed computing system 300 for executing software system 10 (FIG. 1) to confidentially access information present on global computer networks, such as the Internet, in accordance with the present invention. Computing system 300 comprises a plurality of computing devices, including collection nodes 310, search nodes 320, database server 330 and user interface device 340, that are communicatively coupled via network 345. As explained in detail below, each of these computing devices executes one copy of software system 10. Upon execution on each computing device, system executive 20 of software system 10 determines the type of computing device and operates accordingly.

First, system executive 20 determines whether the particular computing device is database server 330. If so, system executive 20 instantiates database manager 80 as a server that directly controls access to the database. If not, system executive 20 instantiates database manager 80 as a client that handles access requests via making a remote procedure call (RPC) to the database manager 80 of database server 330. In addition, system executive 20 determines whether the particular computing device is a collection node 310, a search node 320 or a user interface device 330.

Next, for collection nodes 310, system executive 20 instantiates token queue 55 as an RPC client. For search nodes 320, system executive 20 instantiates token queue 55 as a server that receives tokens over network 345 via RPC calls. Each system executive 20 of collection nodes 310 spawns one or more collection controllers 30 in order to traverse the network resources that are due and are assigned to the corresponding collection node 310. Collection nodes 310 access Internet 360 via router 350. The retrieved informative items are passed to the token queue client which communicates pertinent information, such as the link address and local file location, to a token queue server of one of the search nodes 320. Each system executive 20 of search nodes 320 spawns search controller 50 to accept tokens from token queue 55 and search any received token as illustrated in FIG. 6 described above. In this manner, the informative item retrieved by collection nodes 310 are distributed evenly to search nodes 320, thereby allowing efficient monitoring of vast numbers of network resources.

In one embodiment, network 345 of computing system 300 allows remote access via authorized clients. For example, in one embodiment, user interface device 320 executes Windows NT and handles remote clients using Remote Access Server (RAS). In another embodiment, network 345 supports a virtual private dial network. In this embodiment clients are able to view their corresponding search items, and recently retrieved informative items that matched their search criteria, without communicating confidential information over Internet 300. Thus, unlike conventional search engines, the present invention allows clients to automatically monitor a plurality of network resources of a configured monitoring period without ever communicating the confidential search criteria over an insecure network.

In order to allow an operator to control and configure distributed computing system 300, system executive 20 instantiates user interface 90 upon determining that the computing device is user interface device 340. For example, when various computing devices are added or removed from computing system 300, user interface 90 allows an operator to update the database via database server 330.

Figure 10:
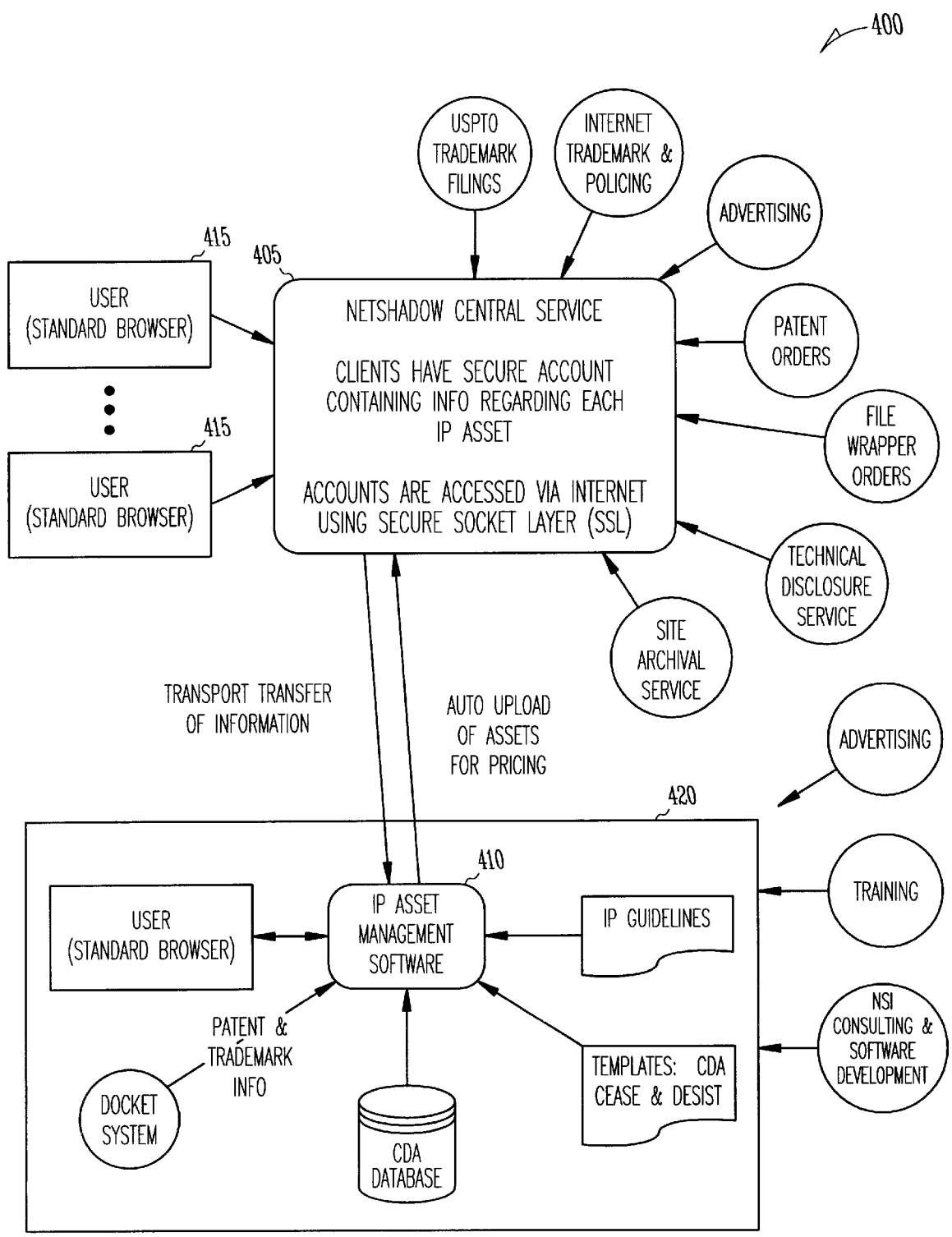
FIG. 10 is a block diagram of one embodiment of a global networked environment in which a service center executes a software system in accordance with the present invention.

FIG. 10 is a block diagram of one embodiment of a global networked environment 400 in which service center 405 executes software system 10 (FIG. 1) in accordance with the present invention. In one embodiment, service center 405 includes distributed computing system 300 (FIG. 9) and executes software system 10 as described above. In addition to confidentially monitoring information as described above, service center 405 integrates advertising and processes electronic orders for patents, file wrappers and technical disclosures (described below). Individual users 415 communicate with service center 405 over a global computer network, such as the Internet, in order to view secure accounts that contain their corresponding search items and any informative items found by service center 405 that satisfy the search criteria. In one embodiment, all communications between users 415 are encrypted and digitally signed and authenticated, thereby ensuring confidentiality.

In one aspect, service center 405 is configured to communicate with intellectual property (IP) management software 410 executing within organization 420 which may be any entity such as a corporation, legal firm, etc. In one embodiment, all communications between service center 415 and organization 420 are encrypted and digitally signed and authenticated, thereby ensuring confidentiality. IP management software 410 is any software suitable for presenting information and status regarding the intellectual property of organization 420. For example, IP management software 410 integrates docketing information, guidelines, templates and existing confidential disclosure agreements.

One beneficial feature of the present invention is that as organization 420 gains new intellectual property, information is automatically (and confidentially) communicated from IP management software 410 to an account within service center 405. The information regarding the new intellectual property is received by service center 405 and added, as a search item with appropriate search criteria, to the account of organization 420. Once received, service center 405 begins monitoring global computer networks for any information regarding the new intellectual property. Thus, the present invention eliminates the need for organization 420 to manually upload information regarding new intellectual property, such as patents and trademarks. Service center 405 sends an alert, such as an email, to organization 420 and users 415 when relevant informative items are added to their accounts.

From time to time inventors use technical disclosure services to publish information they want in the public domain but have decided not to pursue via patent or product. This service, however, is quite expensive and may cost up to $300 per page. Conventional services publish the disclosures anonymously in many countries. Such a service is basically a defensive measure by which the inventors prevent others from patenting the idea.

The present invention contemplates technical publication service that anonymously publishes information on global computer networks. More specifically, users log into a website and submit technical disclosures. Preferably the disclosures are in text, Acrobat (pdf), Microsoft Word or any other commonly used format. When a user submits a disclosure, he or she also submits an abstract and perhaps identifies key terms that best describe the disclosure. According to the present invention, after receipt of the disclosure the network service automatically:

1. Adds the submitted electronic disclosure to a collection of other store publications. In one embodiment the collection of electronic publications is maintained in a jukebox of recordable CDs.
2. Updates a publicly available database, thereby making the publication immediately available to anyone who can access the global computer network.
3. Transmits the stored location of the received electronic disclosure, as well as the abstract and key terms, to a plurality of major search engines, thereby making the new disclosure immediately accessible and locatable.
4. Accesses one of the search engines and exercises the engine to look for any documents that satisfy the key terms of the received disclosure. While accessing the search engine, the service records the results for future proof of publication.
5. Communicates the results to the user via email or paper so that the user can offer the results as evidence that the disclosure was indeed published and available to the public.
6. Maintains the received publication in the database for a fixed period of time, thereby allowing the public to retrieve and view the document.
Various embodiments of a method and system for confidentially accessing and reporting information present on global computer networks have been described. This application is intended to cover any adaptations or variations of the present invention. It is manifestly intended that this invention be limited only by the claims and equivalents thereof.

What is claimed is:

1. A computer-implemented method for gathering information from network resources on a global computer network, the method comprising:

assigning search times to the network resources, the search times designating times at which the network resources are to be searched within a monitoring period;

categorizing the network resources into industry groups;

generating search items, each of the search items defining a search for particular information and designating one or more of the industry groups;

identifying, at a given search time, the network resources that have been assigned the given search time and categorized into industry groups designated by one or more of the search items;

retrieving and storing information from the identified network resources; and performing the searches defined by one or more of the search items on the stored information.

2. The method of claim 1, wherein the retrieval operation excludes information from the network resources that have not been assigned the given search time or are not categorized into industry groups designated by one or more of the search items, thereby conserving computer processing resources.

3. The method of claim 1, wherein the search items are maintained in confidence and are not communicated to any of the network resources.

4. The method of claim 1, further comprising performing the identification and retrieval and storage operations at different search times such that a plurality of the network resources are searched within the monitoring period.

5. The method of claim 1, further comprising performing the identification and retrieval and storage operations for different monitoring periods such that the search of information from the network resources is updated periodically.

6. The method of claim 1, further comprising:
performing the identification and retrieval and storage operations periodically;
analyzing portions of the newly stored information for changes relative to corresponding portions of the information retrieved in a previous retrieval and storage operation; and
performing the searches defined by one or more of the search items on only the portion of the newly stored information that has changed.

7. The method of claim 6, wherein:
the analysis operation includes calculating a checksum for portions of the newly stored information and determining whether the checksum has changed relative to a checksum previously calculated for a corresponding portion of the information retrieved in the previous retrieval and storage operation, and
the search performance operation includes performing the searches defined by one or more of the search items on only the portion of the newly stored information for which the checksum has changed.

8. The method of claim 1, further comprising:
storing the search items and resource identifiers that identify network resources in a database;
retrieving from the database, at a given search time, the search items and resource identifiers corresponding to the network resources that have been assigned the given search time;
identifying, at the given search time, the retrieved resource identifiers corresponding to the network resources that have been designated by one or more of the search items;
retrieving and storing information from the network resources corresponding to the retrieved resource identifiers that have been identified; and
performing the searches defined by one or more of the search items on the stored information.

9. A method for gathering information from network resources on a global computer network, the method comprising:
assigning search times to the network resources, the search times designating times at which the network resources are to be searched within a monitoring period;
generating search items, each of the search items defining a search for particular information and designating one or more of the network resources;
identifying, at a given one of the search times, the network resources that have been assigned the given search time and which are designated by one or more of the search items;
retrieving and storing information from the identified network resources, whereby information from the network resources that have not been assigned the given search time or are not designated by one or more of the search items is not retrieved and stored; and
performing the searches defined by one or more of the search items on the stored information.

10. A method for gathering information from network resources on a global computer network, the method comprising:
generating a set of search items, each of the search items defining a search for particular information and designating one or more of the network resources;
retrieving and storing information from the network resources designated by one or more of the search items;
performing the searches defined by one or more of the search items on the stored information; and
presenting results of the searches.

11. A method for gathering information from network resources on a global computer network, the method comprising:
categorizing the network resources into industry groups;
generating a set of search items, each of the search items defining a search for particular information and designating one or more of the industry groups;
retrieving and storing information from the network resources associated with the industry groups designated by one or more of the search items;
performing the searches defined by the search items on the stored information; and
presenting results of the searches.

12. A method for gathering information from network resources on a global computer network, the method comprising:
selecting a set of network resources residing on the global computer network;
assigning a search time to each of the network resources, the search time indicating a time within a monitoring period in which the network resource is to be searched;
generating a set of search items, each of the search items defining parameters for a search and designating one or more of the network resources to be searched;
determining, at approximately the search time for each of the network resources, whether the respective network resource is designated for searching by at least one of the search items;
retrieving and storing information from the network resources designated by at least one of the search items;
performing the searches defined by the search items on the stored information; and
presenting results of the searches to users.

13. A software system for monitoring network resources residing on a global computer network over a time interval, the system comprising:
a database storing resource identifiers that correspond to particular network resources, and search items that define a search for information and specify one or more of the network resources;
a system executive that constructs a set of the resource identifiers scheduled to be searched, and a set of the search items specifying at least one of the network resources corresponding to one of the resource identifiers of the constructed resource identifier set;
a collection controller, for each of the resource identifiers of the constructed set of resource identifiers, the collection controller retrieving information presented by the networked resource corresponding to the resource identifier;

a search controller for receiving the information retrieved by each of the collection controllers; and a search instance, for each search item of the search item list, wherein the search controller instantiates each search instance to perform the search defined by the respective search item on the information received from the collection controllers for the network resource specified by the respective search item.

14. A method for monitoring information presented by at least one of a plurality of networked computers comprising:

storing a plurality of identifiers, wherein each identifier corresponds to one of the plurality of networked computers;

storing a plurality of search items, wherein each search item includes search criteria and at least one networked computer to be monitored;

generating a set of identifiers to be searched;

generating a set of search items monitoring at least one of the networked computers corresponding to one of the identifiers of the identifier set;

retrieving information presented by each of the networked computers corresponding to an identifier of the identifier set; and searching the retrieved information according the search criteria of each search item of the search item set monitoring the networked computer corresponding to the retrieved information.

* * * * *